(12) United States Patent
Powell et al.

(10) Patent No.: US 9,464,203 B2
(45) Date of Patent: Oct. 11, 2016

(54) THIOLENE-BASED COMPOSITIONS WITH EXTENDED POT LIFE

(71) Applicant: PPG Industries Ohio, Inc., Cleveland, OH (US)

(72) Inventors: Adam B. Powell, Wexford, PA (US); Davina Schwartzmiller, Rural Valley, PA (US); Steven Bowles, Pittsburgh, PA (US); Scott Moravek, Mars, PA (US)

(73) Assignee: PPG industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/645,450

(22) Filed: Mar. 12, 2015

(65) Prior Publication Data

US 2016/0264812 A1    Sep. 15, 2016

(51) Int. Cl.
*C09D 133/08* (2006.01)
*C08K 5/37* (2006.01)

(52) U.S. Cl.
CPC ............... *C09D 133/08* (2013.01); *C08K 5/37* (2013.01)

(58) Field of Classification Search
CPC ........ C09D 133/08; C08K 5/27; B05D 3/06; C08F 2/46

USPC .......................... 524/556; 427/487; 522/110
See application file for complete search history.

(56) References Cited

U.S. PATENT DOCUMENTS

| | | | |
|---|---|---|---|
| 3,898,349 A | 8/1975 | Kehr et al. | |
| 3,908,039 A | 9/1975 | Guthrie et al. | |
| 4,076,917 A | 2/1978 | Swift et al. | |
| 4,097,298 A | 6/1978 | Haeufler et al. | |
| 4,374,235 A | 2/1983 | Culbertson et al. | |
| 4,425,472 A | 1/1984 | Howard et al. | |
| 4,908,397 A * | 3/1990 | Barsotti ............. | C09D 133/064 523/400 |
| 5,236,967 A | 8/1993 | Ohkawa et al. | |
| 5,976,422 A | 11/1999 | Okoroafor et al. | |
| 6,639,046 B1 * | 10/2003 | Van Dijk ............. | C08G 18/671 428/500 |
| 2005/0027082 A1 * | 2/2005 | Narayan-Sarathy .. | C08F 22/105 525/471 |
| 2009/0047442 A1 * | 2/2009 | Bowman .................. | C09D 4/00 427/487 |

FOREIGN PATENT DOCUMENTS

GB          1469935 A     10/2003

* cited by examiner

*Primary Examiner* — Michael M Bernshteyn
(74) *Attorney, Agent, or Firm* — William J. Uhl

(57) ABSTRACT

A curable composition comprising a polyene, a polythiol and an anhydride is disclosed.

23 Claims, No Drawings

THIOLENE-BASED COMPOSITIONS WITH EXTENDED POT LIFE

FIELD OF THE INVENTION

The present invention relates to curable compositions comprising a polyene and a polythiol with extended pot life.

BACKGROUND OF THE INVENTION

Polyenes containing unsaturated groups, such as aclyloyl groups, react with active hydrogen-containing compounds. Such a reaction is believed to involve an addition of an anion derived from the nucleophilic, active hydrogen-containing compound, acting as a donor, to an activated unsaturated group, which serves as an acceptor. When these active hydrogen-containing compounds are C—H compounds such as malonic ester or acetoacetate, the reaction is known as the Michael addition reaction. It is also known that SH-compounds may function as active hydrogen-containing compounds in a reaction mechanism which is similar to the Michael addition reaction. Such a reaction mechanism with SH-compounds is called a thiolene reaction.

Catalysts for the thiolene reaction include quaternary ammonium compounds, tetramethyl guanidine, diaza-bioyclo-undecene, and diaza-bicyclo-nonene. Thiolene reactions catalyzed by these strong bases are hard to control and have a short pot life. Pot life being defined as the period of time a curable polyene-polythiol mixture remains suitable for application after mixing. Such a composition is non-gelled and has a viscosity sufficient for application as a coating.

SUMMARY OF THE INVENTION

The present invention is directed to a curable composition comprising:
(a) a polyene,
(b) a polythiol, and
(c) an anhydride.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic. Likewise, allyl and methallyl are designated as (meth)allyl.

Aliphatic and cycloaliphatic are designated as (cyclo)aliphatic.

Unless otherwise indicated, molecular weights are on a number average basis determined by gel permeation chromatography using polystyrene standards with the unit of g/mol.

Suitable polyenes for use in the present invention are numerous and can vary widely. Such polyenes can include those that are known in the art. Non-limiting examples of suitable polyenes can include those that are represented by the formula:

$$A\text{-}(X)_m$$

wherein A is an organic moiety, m is an integer of at least 2, and X is an olefinically unsaturated moiety and m is at least 2, typically 2 to 6. Examples of X are groups of the following structure:

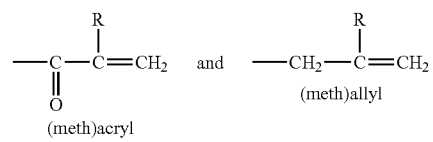

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Aliphatic and/or cycloaliphatic (meth)acrylates in each case are preferably used. (Cyclo)aliphatic polyurethane (meth)acrylates and (cyclo)aliphatic polyester (meth)acrylates are particularly preferred. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth) acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth) acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triayl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the curable topcoat composition are numerous and can vary widely. Such polythiol functional materials can include those that are known in the art. Non-limiting examples of suitable polythiol functional materials can include, but are not limited to, polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include, but are not limited to, materials of the formula:

wherein R$_1$ is a polyvalent organic moiety and n is an integer of at least 2, typically 2 to 6.

Non-limiting examples of suitable polythiols include, but are not limited to, esters of thiol-containing acids of the formula HS-R$_2$—COOH wherein R$_2$ is an organic moiety with polyhydroxy compounds of the structure R$_3$—(CH)$_n$ wherein R$_3$ is an organic moiety and n is at least 2, typically 2 to 6. These components can be reacted under suitable conditions to give polythiols having the general structure:

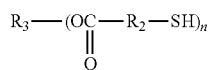

wherein R$_2$, R$_3$ and n are as defined above.

Examples of thiol-containing adds are thioglycolic acid (HS—CH$_2$COOH), α-mercaptopropionic acid (HS—CH(CH$_3$)—COOH) and β-mercaptopropionic acid (HS—CH$_2$CH$_2$COOH) with polyhydroxy compounds such as glycols, triols, tetraols, pentaols, hexaols, and mixtures thereof. Other non-limiting examples of suitable polythiols include, but are not limited to, ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Typically, the mole ratio of polythiol to polyene is from 0.1 to 10/1, such as 0.4 to 1.6/1.

The anhydrides useful in the practice of the invention typically have molecular weights from 50 to 1,000,000. They may be low molecular weight monomeric anhydrides, for example, those with molecular weights in the range of 98 to 900, or polymeric anhydrides, for example, those having molecular weights up to 1,000,000. Examples of monomeric anhydrides are maleic anhydride, hexahydrophthalic anhydride, succinic anhydride, phthalic anhydride, tetrahydrophthalic anhydride, including alkyl-substituted anhydrides such as methyl hexahydrophthalic anhydride and methyl succinic anhydride.

Examples of anhydride-containing polymers are anhydride-containing (meth)acrylic polymers having at least two anhydride groups and having a molecular weight of 1,000 to 1,000,000.

The anhydride-containing (meth)acrylic polymer can be prepared by various means known to one skilled in the art such as conventional free-radical or controlled free-radical polymerization. For example, the anhydride-containing (meth)acrylic polymer can be prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride-containing (meth)acrylic polymer is formed by polymerizing monomers of alkyl methacrylates, or alkyl acrylates or mixtures thereof, where the alkyl groups have 1-12 carbon atoms and ethylenically unsaturated anhydrides (or ethylenically unsaturated dicarboxylic acids which are converted to the acid anhydride during the polymerization).

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other ethylenically unsaturated monomers such as styrene, 2-methyl styrene, (meth)acrylonitrile, (meth)acrylamide, (meth)acrylo alkoxy silanes and (meth) acrylic acid may also be used. These other monomers are typically present in amounts of at least up to 99, such as 60 to 95 percent by weight based on total weight of the monomers used to prepare the polymer.

Typically useful ethylenically unsaturated anhydrides are itaconic anhydride, maleic anhydride, isobutenyl succinic anhydride and the like. Typically, the ethylenically unsaturated anhydride is present in the (meth)acrylic polymer in amounts of at least 1, such as 5 to 40 percent by weight based on total weight of monomers used to prepare the polymer.

The anhydride is present in the composition in amounts of 0.001 to 20, such as 0.01 to 10 percent by weight based on weight of resin solids of the composition.

The composition also optionally contains a catalyst. Such catalysts typically have a basic pH. Suitable catalysts include secondary and tertiary amines and phosphines. Examples include triethylamine, dimethylhexylamine, dimethyloctylamine, dimethyldodecylamine, dimethylamino alcohol, tetramethyl guanidine, diaza-bicyclo-octane, diaza-bicyclo-undecene, diaza-bicyclo-nonene, trioctyl phosphine and triphenyl phosphine. The catalyst is present in the composition in amounts of 0.001 to 10, such as 0.01 to 5 percent by weight based on resin solids weight of the composition. In an embodiment of the invention, the mole ratio of anhydride to catalyst is within the range of 0.1 to 10/1, such as 1 to 5/1.

Other optional ingredients, such as dyes, tints, plasticizers, anti-oxidants, thixotropic agents, reactive diluents, hindered amine light stabilizers, UV light absorbers and stabilizers may be formulated into the curable compositions of the present invention. These ingredients may be present (on an individual basis) in amounts up to 30 percent, often from 0.1 to 5 percent by weight based on total weight of resin solids of the film-forming composition.

The compositions may also contain a pigment. Examples of pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, guinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, iron oxide and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

The compositions may contain a corrosion-inhibiting pigment when the composition is used as a primer. Examples of corrosion-inhibiting pigments are metal salts selected from sodium salt, magnesium salt, calcium salt, lithium salt, zinc salt, chromium salt, titanium salt, zirconium salt, aluminum salt, barium salt, strontium salt, molybdenum salt, cerium salt, praseodynenym salt, chromium salt, lead salt, yttrium salt or combinations thereof. Furthermore, examples of metal salts include metal hydroxide, carbonate, phosphate, phosphonate, phosphite, polyphosphate, chromate, molybdate, silicate, borate, metaborate, oxide or combinations thereof.

When present, pigment is typically present in the composition in amounts of up to 80, such as 1 to 80 percent by weight based on total solids weight of the composition.

The compositions typically contain a diluent to dissolve and/or disperse the various ingredients in the composition. Examples of suitable diluents are organic materials and aromatic materials such as toluene and xylene, esters such as butyl acetate and amyl acetate, ethers such as diallyl ethers of ethylene and propylene glycol, ketones such as methyl ethyl ketone and methyl amyl ketone.

The compositions are typically formulated to a solids content of 1 to 100, such as 20 to 80 percent by weight based on total weight of the composition.

The ingredients of the composition are mixed with one another with low shear mixing to form the curable composition. When pigments are present, they are usually ground with high shear mixing in one of the resinous ingredients of the composition such as the polythiol or polyene or anhydride to form a pigment paste that then is incorporated into the composition with low shear mixing.

The curable compositions are useful as protective or decorative coating compositions and may be used as primer coats or topcoats including color coats and clear coats. The compositions are curable at low temperatures such as −10 to 80° C., and find particular utility in the refinish of automobiles and trucks.

The compositions of the present invention may be applied over any of a variety of substrates such as metallic, glass, wood, and/or polymeric substrates, and can be applied by conventional means including, but not limited to, brushing, dipping, flow coating, spraying and the like. They are most often applied by spraying. The usual spray techniques and equipment for air spraying, airless spraying, and electrostatic spraying employing manual and/or automatic methods can be used. Suitable substrates include, but are not limited to, metal substrates such as ferrous metals, zinc, copper, magnesium, aluminum, aluminum alloys, and other metal and alloy substrates such as those typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric, plastic, or composite substrates such as those that are found on motor vehicles. By "plastic" is meant any of the common thermoplastic or thermosetting synthetic nonconductive materials, including thermoplastic olefins such as polyethylene and polypropylene, thermoplastic urethane, polycarbonate, thermosetting sheet molding compound, reaction-injection molding compound, acrylonitrile-based materials, nylon, and the like. By "composite" is meant any substrate consisting of fibers, typically of glass or carbon, or other filler material that is incorporated with polymeric or plastic materials, commonly of epoxy type polymers.

As shown in the Examples that follow, the compositions without the anhydride have relatively short pot lives. However, compositions with the anhydride have extended pot lives. However, the resultant cured coatings have equivalent physical properties to the cured coatings without the anhydride.

EXAMPLES

The following examples are offered to aid in understanding of the present invention and are not to be construed as limiting the scope thereof. Unless otherwise indicated, all parts and percentages are by weight.

Example A

A pigment grind was prepared in a stainless steel beaker according to the following procedure:

| Item Description | Mass (g) |
|---|---|
| Thiocure PETMP[1] | 668.6 |
| DISPERBYK-163[2] | 7.5 |
| BYK-325[2] | 7.5 |
| n-butyl acetate | 71.6 |
| Stir with Cowles blade for 5 minutes | |
| Mapico Black 845[3] | 12.1 |
| n-butyl acetate | 10.8 |
| Stir with Cowles blade for 5 minutes | |
| Talcron MP 15-38[4] | 417.5 |
| Tioxide TR92[3] | 33.4 |
| n-butyl acetate | 71.6 |
| Stir with Cowles blade for 20 minutes | |

[1]Pentaerythritol tetrakis (3-mercaptopropionate) from BRUNO BOCK Chemische Fabrik GmbH & Co. KG.
[2]Dispersing Agent and Flow Additive from BYK USA Inc.
[3]Pigments from Huntsman.
[4]Talc from Barretts Minerals Inc.

Then the dispersion was placed on a Hockmeyer Micro-mill equipped with Zirconox 0.7-1.2 mm grinding media. While milling, dry ice was placed around the container to control the temperature. The dispersion was milled until a particle size of 18-20 microns was achieved. The mixture was then reduced with 220.4 g of n-butyl acetate.

Example 1

Example formulations listed in Table 1 were combined and monitored for pot life. Pot life is determined by viscosity change over time on a CAP 2000 Viscometer with a #1 spindle set at 900 RPM at 25° C. The time it takes for the viscosity to double that of the initial viscosity is reported as pot life. Gel time is the time elapse after combining all ingredients until the composition does not flow, such as when a vial is inverted and the composition does not flow. Select formulations were also tested for film drying and curing properties. Tack-free time is the amount of time required for a coating to achieve a level of dryness, such that upon the application and removal of a cotton ball, no cotton fibers are transferred to the coating surface. MEK double rubs are reported as the number of double rubs, with a methyl ethyl ketone soaked rag, required to dissolve the coating such that the substrate is visible. This test was performed 1 hour after tack-free and the maximum number of double rubs recorded is 100.

TABLE 1

| | 1A | 1B | 1C | 1D | 1E |
|---|---|---|---|---|---|
| | Formula by weight (g) | | | | |
| Example A | 50.0 | 50.0 | 50.0 | 9.8 | 50 |
| SR399LV[1] | 18.3 | 18.3 | 18.3 | 3.6 | 18.3 |
| n-butyl acetate | 13.2 | 8 | 7.9 | 1.1 | 13.0 |
| Anhydride resin[2] | 0 | 0 | 0.7 | 0 | 1.04 |
| maleic anhydride | 0 | 0 | 0 | 1.13[3] | 0 |
| Catalyst[4] | 0 | 5.2 | 5.2 | 1.0 | 0 |
| | Properties | | | | |
| Pot life (min) | 30-45 | 30-45 | 60-75 | 120 | <15 |
| Gel-time | >3 hr | 102 min | 2-3 hr | | <15 |
| Tack-free time (min) | 300 | 105-120 | 30-45 | | |
| MEK Double Rubs | 100 | 90 | 100 | | |

[1]Penta-functional acrylate from Sartomer.
[2]Example 1 from U.S. Pat. No. 4,798,745 incorporated herein by reference.
[3]1 wt % solution of maleic anhydride in n-butyl acetate,
[4]1 wt % solution of N,N-Dimethylethanolamine in n-butyl acetate.

The compositions of Example 1A, 1B, and 1C were spray applied with a 3M Accu-Spray HG18 spray gun with 1.8 mm nozzle to an ACT cold roll steel panels (10.16 cm by 30.48 cm) with ED6060 electrocoat available from ACT Laboratories, Inc. The compositions were applied in two coats with an ambient flash until visibly dry between coats. A dry film thickness of about 2.5 to 3.5 mils (about 64 to 89 micrometers) was targeted. After coating application, cure was allowed to occur at ambient conditions.

It can be seen from Table 1 that a catalyst is typically necessary to achieve short tack-free time and good solvent resistance properties but at the expense of having a short pot life. With incorporation of anhydride with catalyst, a longer pot life is achieved while also having a short tack-free time and excellent solvent resistance, a desirable combination of properties. It can also be seen that the use of anhydride without catalyst can also cure the formula if desired.

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

What is claimed is:

1. A curable composition comprising:
   (a) a polyene,
   (b) a polythiol,
   (c) 0.001 to 20 percent by weight of an anhydride, and
   (d) up to 80 percent by weight of a pigment, wherein the mole ration of (b) to (a) being from 0.1 to 10/1; the percentage by weight of (c) being based on weight of resin solids in the composition and the percentage by weight of (d) being based on solids weight of the composition.

2. The composition of claim 1 in which the pigment is a corrosion-inhibiting pigment.

3. The composition of claim 1 in which the polyene has the structural formula $$A\text{-}(X)_m$$

where A is an organic moiety; X is an olefinically unsaturated moiety and m is at least 2.

4. The composition of claim 3 in which X is selected from —C(O)CHR═CH$_2$ and —CH$_2$—CHR═CH$_2$, where R is hydrogen or methyl.

5. The composition of claim 3 in which A contains groups selected from ester and urethane.

6. The composition of claim 3 in which A is derived from a polyisocyanate.

7. The composition of claim 3 in which A-(X)$_m$ is a polyurethane (meth)acrylate.

8. The composition of claim 3 in which A-(X)$_m$ is a polyester (meth)acrylate.

9. The composition of claim 6 in which the polyisocyanate is an aliphatic including a cycloaliphatic polyisocyanate.

10. The composition of claim 3 in which m is from 2 to 6.

11. The composition of claim 1 in which the polythiol has the structural formula R$_1$—(SH)$_n$ where R$_1$ is an organic moiety and n is at least 2.

12. The composition of claim 11 in which R$_1$ contains ester groups.

13. The composition of claim 11 in which R$_1$ is derived from a polyol.

14. The composition of claim 11 in which the polythiol is the reaction product of a thiol-functional organic acid and a polyol.

15. The composition of claim 11 in which n is from 2 to 6.

16. The composition of claim 1 in which the anhydride is an anhydride-containing polymer.

17. The composition of claim 16 in which the polymer is a (meth)acrylic polymer.

18. The composition of claim 1 that comprises a catalyst.

19. The composition of claim 18 in which the catalyst is a secondary or tertiary amine.

20. The composition of claim 18 in which the catalyst is present in the composition in amounts of 0.001 to 10 percent by weight based on weight of resin solids in the composition.

21. A curable composition comprising:
    (a) a polyene,
    (b) a polythiol,
    (c) 0.001 to 20 percent by weight of an anhydride,
    (d) 0.001 to 10 percent by weight of a basic catalyst, and
    (e) 0.1 to 80 percent by weight of a pigment,
the mole ratio of (b) to (a) being from 0.1 to 10/1, (c) and (d) being based on weight of resin solids in the composition, the percentage by weight of (e) being based on solids weight in the composition.

22. The curable composition of claim 1 in which the mole ratio of anhydride to catalyst is in the range of 0.1 to 10/1.

23. The curable composition of claim 21 in which the mole ratio of anhydride to catalyst is in the range of 0.1 to 10/1.

* * * * *